May 11, 1937.  H. S. EBERHARD  2,079,903
TRANSMISSION
Filed Jan. 17, 1934  6 Sheets-Sheet 1

INVENTOR.
HARMON S. EBERHARD
BY Charles M Fryer
ATTORNEY.

Patented May 11, 1937

2,079,903

UNITED STATES PATENT OFFICE 2,079,903

TRANSMISSION

Harmon S. Eberhard, Peoria, Ill., assignor to Caterpillar Tractor Co., San Leandro, Calif., a corporation of California Application January 17, 1934, Serial No. 706,921

25 Claims. (Cl. 74—342)

The present invention relates to vehicles, and more particularly to the provision of transmission means providing a selective change speed drive therefor.

It is an object of the invention to provide an improved change speed drive for a vehicle, of a compact and simple arrangement, by means of which a plurality of forward and reverse drives can be provided for the vehicle.

Another object of the invention is to provide an improved change speed transmission for a vehicle, in which a plurality of shiftable gears on a plurality of shafts are selectively controlled to establish the drive connection.

Another object of the invention is to provide an improved change speed transmission in which a plurality of change speed gears can be shifted simultaneously without the exertion of any unusual effort on the part of the operator.

Another object of the invention is to provide an improved change speed transmission including a plurality of shiftable gears which can be shifted to operative position in selected combinations by the manipulation of a single control member.

Another object of the invention is to provide an improved change speed transmission having the reverse idler gears mounted in a manner to promote compactness and simplicity of arrangement.

Another object of the invention is to provide a simple, positive locking means for preventing unintentional movement of the shiftable gears of a transmission from their adjusted position.

Another object of the invention is to provide improved means for preventing shifting movement of the gears of a change speed transmission when a drive is being transmitted thereby.

Another object of the invention is to provide improved latching means for the shiftable gears of a transmission, said means acting as a resilient latch when the transmission is idle and as a positive lock when the transmission is in operation.

Another object of the invention is to provide improved latching means for the shiftable gears of a transmission control means, which is rendered operative or inoperative under control of the clutch control means controlling the drive for the transmission.

Another object of the invention is to provide an improved interlock between the gear shift lever and the clutch control lever of the transmission.

Other objects will appear as the description progresses.

Description of mechanism

Figure 1:
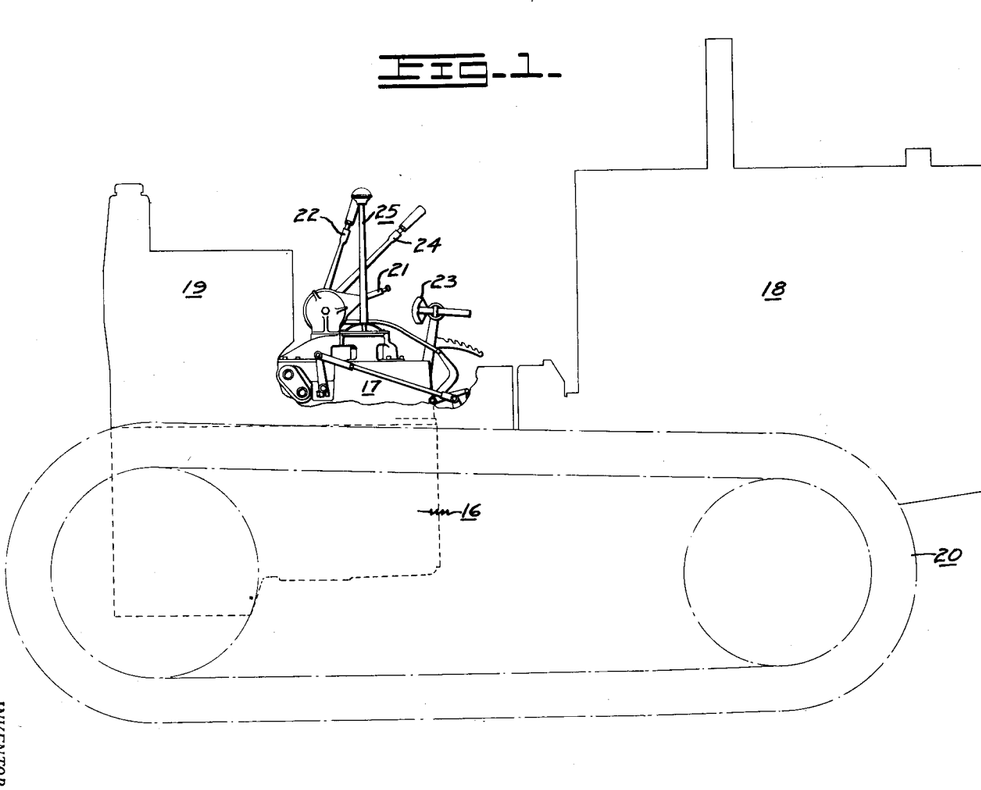
Fig. 1 is a schematic side elevation of a track-type tractor in which the instant invention is employed; the gear shift lever for the change speed transmission being illustrated in its relation to the other tractor controls.

The vehicle shown herein for purposes of illustration is a track-type tractor which comprises generally transmission case 16 (Fig. 1) having cover 17, which houses the change speed transmission described hereinafter. Forwardly of transmission case 16, engine 18 is provided, and rearwardly thereof operator's seat 19 is positioned. The above parts are united to form a body portion which is supported on a pair of endless track mechanisms 20, one of which is indicated schematically in Fig. 1. At the operator's station in front of seat 19, a plurality of tractor controls are provided including throttle control 21, steering clutch controls 22, brake pedals 23, flywheel clutch control lever 24, and a single gear shift lever 25 for the transmission. All the above-mentioned control members are conveniently grouped in front of seat 19 for operation by the tractor operator.

Within transmission case 16, a plurality of shafts are mounted; said shafts having a plurality of gears mounted thereon to provide for the transmission of the drive thereto at selected speeds in selected directions. In the preferred form of the invention disclosed herein, six forward and two reverse speeds are provided, any one of which can be selected by the manipulation of the single control member 25. To accomplish this purpose, a plurality of shiftable gears are grouped on certain of the shafts, which can be shifted selectively in various combinations to determine a selected speed for operation of the vehicle.

The preferred construction and arrangement of the shafts, and the gears thereon will now be described in detail. Three shafts are spaced in triangular relation within the transmission case; two of the shafts being provided with sets of shiftable gears for selectively transmitting the drives therebetween through the third shaft which is a countershaft having a plurality of non-shiftable gears positioned to be engaged by the shiftable gears. The drive from the engine is transmitted through a suitable clutch (not shown) to upper transmission, drive shaft 31 (Fig. 4) which is journaled adjacent its rear end in bearing 32 in vertical transverse wall 33 of transmission case 16, and adjacent its front end in bearing 34 in end cover 36 secured to transmission case 16 by suitable fastening means 37. Bearing 32 is held between nut 38 threaded on shaft 31 and the rear end of splined portion 39 of said shaft. Bearing 34 engages the front end of splined portion 39, and is held between retainer 41 and cover 42 secured by suitable cap screws to end cover 36. Cover 42 houses seal 43 engaging collar 44 non-rotatably mounted on shaft 31 and forming part of the clutch mechanism. Thus, the upper transmission shaft is journaled in the transmission case and extends therethrough to receive the drive from the engine through a suitable clutch.

Figure 4:
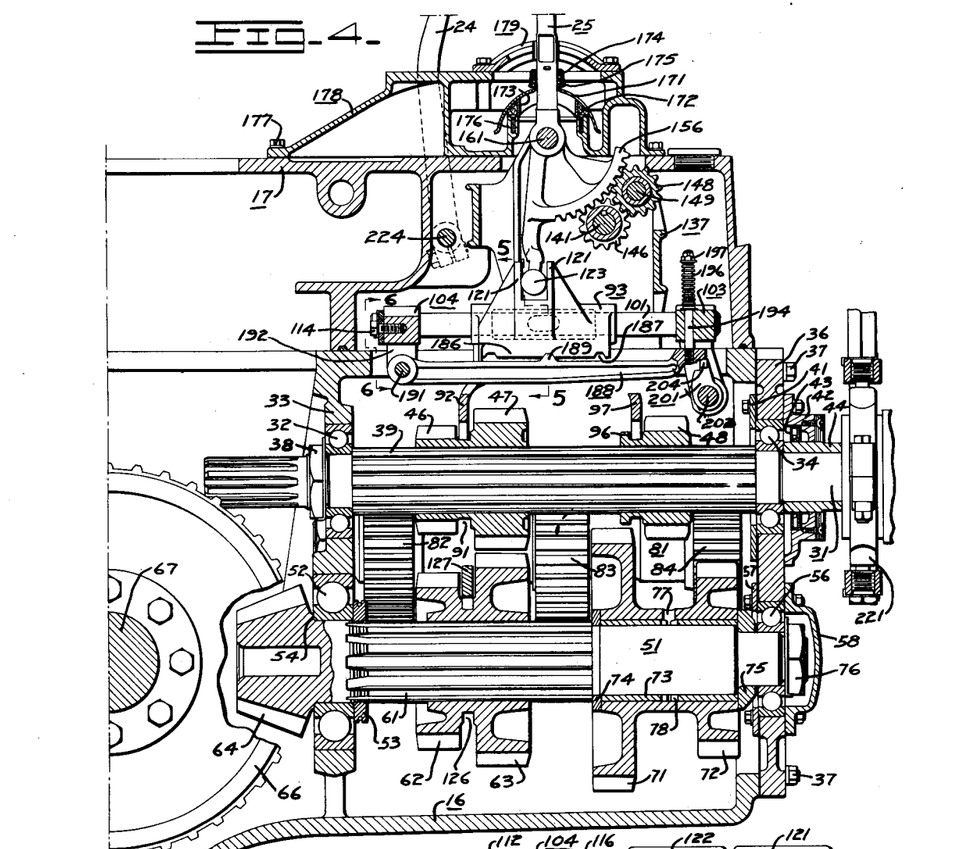
Fig. 4 is a vertical longitudinal section taken in the plane containing the axes of the upper and lower transmission shafts.

Splined portion 39 of shaft 31 extends between wall 33 and cover 36, and provides a mounting for a plurality of axially shiftable gears comprising shiftable integral gears 46, 47 and shiftable gear 48 spaced from gears 46, 47. Gears 46, 47 and 48 provide means for transmitting the drive at a selected gear ratio from upper transmission shaft 31, as will be described more specifically hereinafter.

A lower transmission, driven shaft provides a mounting for shiftable gears to transmit the drive thereto from drive shaft 31 through an intermediate shaft, and for a set of idler gears which are used for the reverse speed drives of the transmission. Lower transmission, driven shaft 51 (Fig. 4) is journaled adjacent its rear end in bearing 52 in wall 33, bearing 52 being secured with respect to said shaft by means of nut 53 threaded on the shaft and shoulder 54 formed on the shaft. At its front end, shaft 51 is journaled in bearing 56 in cover 36. Bearing 56 is positioned in cover 36 by means of retainer 57 and small cover 58. Splined rear portion 61 on shaft 51 provides a mounting for integral gears 62, 63 axially shiftable thereon, the gears being shiftable by means hereinafter described to transmit the drive to shaft 51. The rear end of shaft 51 is formed with integral beveled pinion 64 which meshes with bevel gear 66 on the drive shaft 67. Drive shaft 67 extends transversely through the transmission case and serves to drive the traction devices of the tractor in any suitable manner, through a suitable final drive mechanism.

The forward end portion of shaft 51 has integral reverse idler gears 71, 72 journaled thereon by means of bushing 73 spaced from the end of splined portion 61 by spacer 74, and from bearing 56 by spacer 75 and suitable shims. Spacer 74, gears 71, 72, spacer 75, and bearing 56 are held between the forward end of splined portion 61, and nut 76 threaded on the front end of shaft 51. The bearing portion of integral gears 71, 72 is apertured at 77 to provide for access of lubricant to bushing 73 which has a plurality of lubricant receiving apertures 78.

Figure 8:
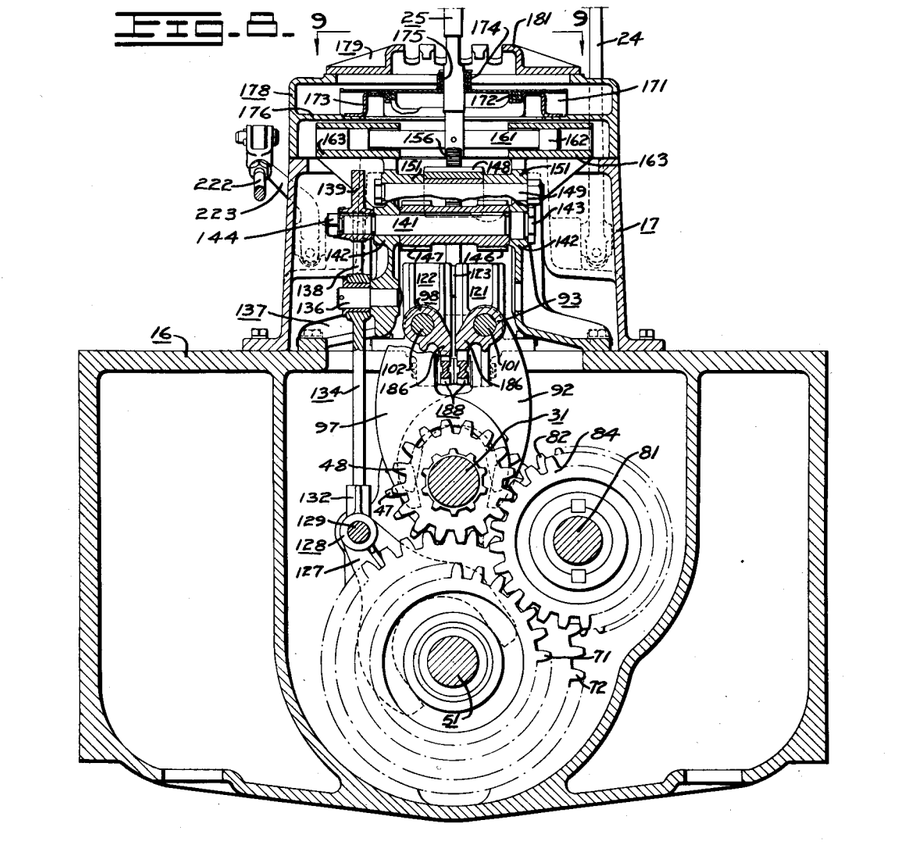
Fig. 8 is a vertical transverse section taken on the line 8—8 in Fig. 2.

A third or intermediate shaft is provided for transmitting the drive from the upper or drive shaft 31 to the lower or driven shaft 51 of the transmission; and a plurality of spaced gears are fixedly mounted on the intermediate shaft which serves as a countershaft. Countershaft 81 (Figs. 4 and 8) is mounted for rotation in wall 33 and cover 36, similarly to shaft 51, and has non-shiftable spaced gears 82, 83 and 84 fixed thereon for rotation therewith. As seen in Fig. 8, shaft 81 is offset laterally relative to shafts 31, 51, and has its axis disposed in triangular relation with respect to the axes of shafts 31, 51, whereby the gears thereon can mesh with gears on both of shafts 31, 51, while shafts 31 and 51 are so disposed that some of the gears thereon can be directly meshed.

As noted above, the various shiftable gears on the drive and driven transmission shafts are selectively positioned to afford eight different speeds, six forward, and two reverse, and the shifted positions thereof from the neutral positions shown in Fig. 4 for the various speeds will now be described, reference being made to the schematic elevational views in Figs. 10 through 17. For convenience, the six forward speeds will be referred to from the lowest to the highest gear ratio, as first, second, third, etc. speeds, while the two reverse speeds will be termed low-reverse and high-reverse. In each figure, the direction of rotation of the active gears is indicated by arrows.

Figures 10, 10A:
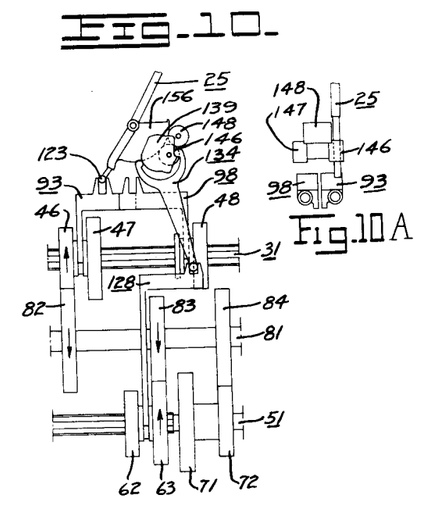
Figs. 10 through 17A are schematic views illustrating the arrangement of the change speed gears and the control means therefor, in the various speed drives which can be obtained thereby. The figures are in groups each of which consists of two views, one of which is designated by a numeral alone and is a developed side elevation, similar to Fig. 2, and the other of which is designated by the letter A after the numeral and is a fragmentary transverse elevation, similar to Fig. 8, illustrating the laterally displaced position of the gear shift lever.

Fig. 10 illustrates the shifted position of the gears to determine the drive in first speed. To transmit the drive from drive transmission shaft 31, gear 46 is shifted to the left from its neutral position to mesh with gear 82 on shaft 81, as shown in Fig. 10. Gear 83 on shaft 81 is meshed with gear 63 on shaft 51 to transmit the drive thereto, said gear 63 being shifted to the right from its neutral position. The low speed ratio is obtained between gears 46 and 82; gear 46 being of smaller diameter than the gears 48 and 47 on drive shaft 31, and gear 82 being of larger diameter than gears 83, 84.

Figures 11, 11A:
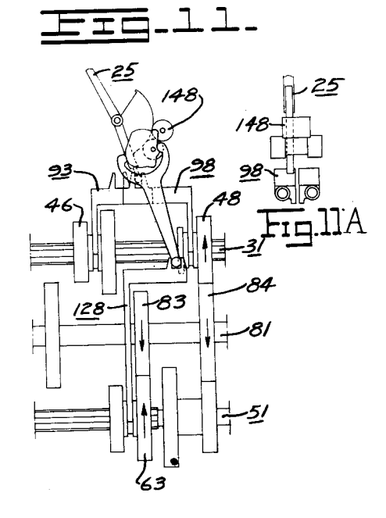

Fig. 11 illustrates the position of the gears to determine the drive in second speed, i. e., the next to the lowest gear ratio. To obtain this drive, gear 48, which is larger than gear 46, is shifted to the right from its neutral position to mesh with gear 84 on shaft 81, while gear 63 is meshed with gear 83 to receive the drive therefrom as in Fig. 10.

Figures 12, 12A:
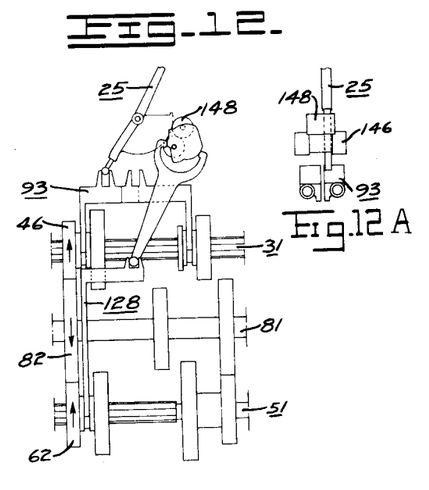

Fig. 12 illustrates the condition of the gears to determine a drive in third speed. Gear 46 is shifted to the left from its neutral position to mesh with gear 82 on shaft 81; and gear 62 is also shifted to the left to mesh with gear 82. Gear 46 is of smaller diameter than gear 62 to obtain the desired speed ratio.

Figures 13, 13A:
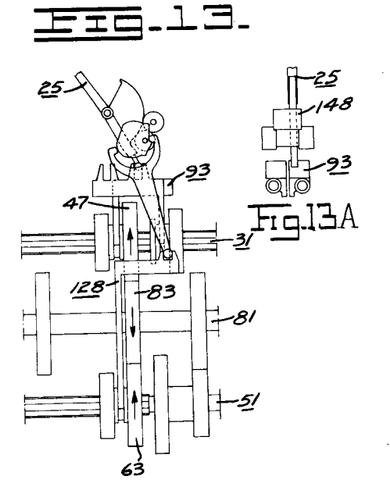

Fig. 13 illustrates the position of the gears to determine the drive in fourth speed. To obtain this condition, gear 47 is shifted to the right from its neutral position to mesh with gear 83 on shaft 81, which is also in mesh with gear 63 on shaft 51; gear 63 being also shifted to the right from neutral position. Gear 47 is of slightly smaller size than gear 63 to obtain the desired speed ratio.

Figures 14, 14A:
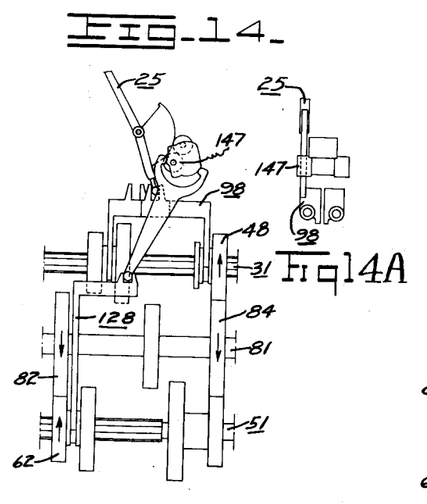

In Fig. 14, which illustrates the gears arranged for fifth speed drive, gear 48 is shifted to the right from neutral position to mesh with gear 84 on shaft 81, and gear 62 is shifted to the left from its neutral position to mesh with and receive the drive from gear 82 on shaft 81. The desired speed ratio is obtained by the relative sizes of the gears; gear 48 being smaller than gear 62, while gear 82 is of slightly greater size than gear 84.

Figures 15, 15A:
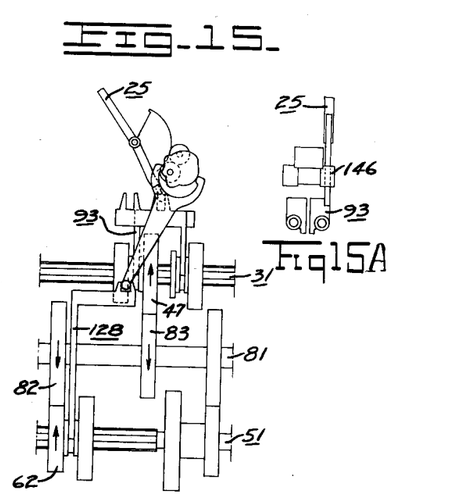

Fig. 15, illustrating the sixth speed position of the gears, shows gear 47 as shifted to the right from neutral position to mesh with gear 83 on shaft 81, while gear 62 is shifted to the left from neutral position to mesh with gear 82 on shaft 81. As gear 47 is slightly smaller than gear 83, and gear 82 is slightly larger than gear 62, the desired speed ratio is obtained.

Figures 16, 16A:
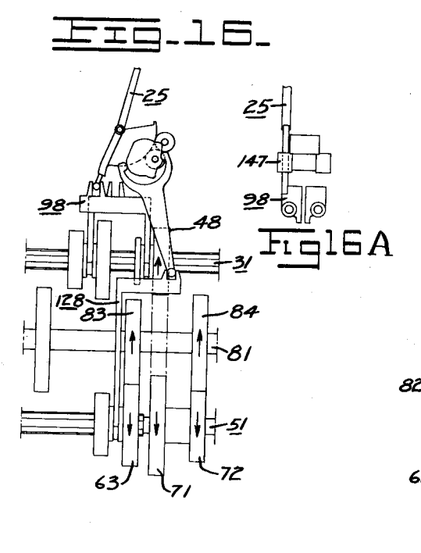

Fig. 16 illustrates the condition of the gears to obtain the drive in low-reverse. Gear 48 is shifted to the left from neutral position to mesh with gear 71 integral with gear 72. In the developed view, the meshing of gears 48 and 71 is illustrated by the phantom lines extending therebetween. Gear 72 meshes with gear 84 on shaft 81 at all times, such engagement being idle except during reverse speed drives. Gear 63 is shifted to the right from neutral position to mesh with gear 83 on shaft 81 to transmit the drive therefrom to shaft 51. It is noted that by means of idler gears 71, 72 on shaft 51, the direction of rotation of shaft 51 is reversed from that shown in the preceding figures.

Figures 17, 17A:
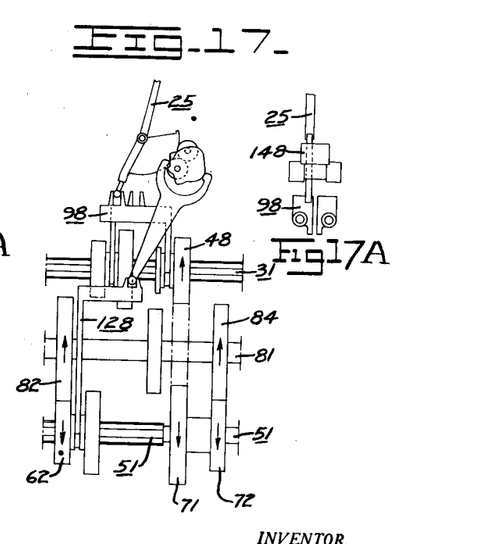

Fig. 17 illustrates the position of the gears for high-reverse speed, which is identical with that in Fig. 16, except that gear 62 is shifted to the left to mesh with gear 82 to obtain the different speed ratios afforded thereby.

From the foregoing description, it is seen that by positioning the shiftable gears on drive shaft 31 and the shiftable gears on driven shaft 51 in various combinations with respect to the gears on countershaft 81, a plurality of different drives can be obtained. It is to be noted that each of the two gears 46 and 47 on drive shaft 31 can be positioned to determine a drive from shaft 31 in one position thereof, while gear 48 is shiftable to two positions to transmit a drive from shaft 31 as illustrated in Figs. 11 and 16. It is seen, also, that a drive can be transmitted to driven shaft 51 through either of gears 62, 63, in any of the shifted positions of any one of gears 46, 47, 48. Thus, for each drive from shaft 31 determined by any shifted position of any of gears 46, 47, 48, two different drives can be transmitted to shaft 51 by means of shifting of gears 62, 63. All of the drives are in the forward direction except those effected by shifting gear 48 in the positions shown in Figs. 16 and 17. It is seen, also, that a compact, simple arrangement of the gears is provided to obtain eight different speed drives, and that one of the important contributing factors is the journaling of the reverse idler gears 71, 72 about the axis of the driven shaft 51. As the description progresses, it will be noted also that the arrangement of the gears facilitates the provision of a compactly arranged and readily adjusted control means therefor.

Selective control means is provided for effecting meshing of the shiftable transmission gears with the fixed gears, in response to manipulation of a single control member; said control means causing movement of certain of the shiftable gears in reverse directions, irrespective of the direction of movement imparted to other of said shiftable gears. The control means includes connections from the shiftable gears to rows of elements movably mounted adjacent operative extensions on the single gear shift member or lever whereby lateral shifting, or step-by-step movement of the lever effects operative engagement of the lever extensions with selected combinations of said elements. Lateral shifting of the lever is also utilized to control movement of the direction of movement of the shiftable gears of the transmission, independently of the oscillatory movement of said lever which accomplishes meshing of the various gears.

Figures 5, 6, 7:
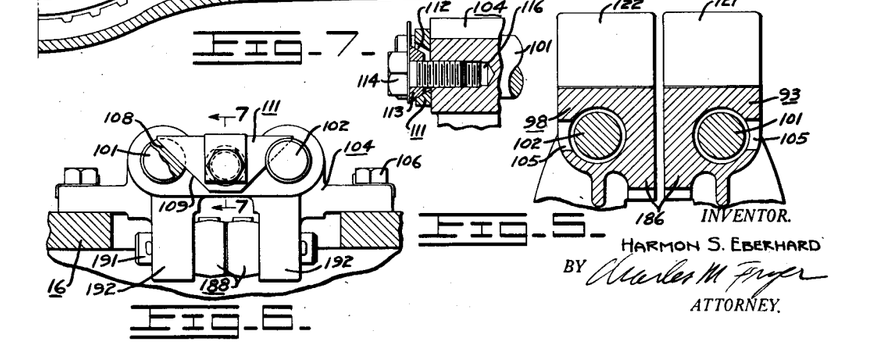
Fig. 5 is a fragmentary section taken on the line 5—5 in Fig. 4.
Fig. 6 is a fragmentary elevational view in a plane indicated by line 6—6 in Fig. 4.
Fig. 7 is a fragmentary sectional view taken on the line 7—7 in Fig. 6.

Integral gears 46, 47 (Figs. 2 and 4) have annular groove 91 formed therebetween to receive forked, arcuately shaped extension 92 of shiftable collar 93 (Figs. 4 and 8). Shiftable gear 48 (Figs. 2 and 4) has annular groove 96 adapted to receive forked, arcuately shaped extension 97 of shiftable collar 98 (Fig. 8) similar to collar 93. Collars 93 and 98 are slidably mounted on parallel shafts 101 and 102 which are fixedly mounted in end brackets 103 and 104. Apertures 105 (Fig. 5) in collars 93, 98 provide for access of lubricant to the bearing surfaces thereof with shafts 101, 102. Brackets 103, 104 are secured by screws 106 (Figs. 2, 3 and 6) to transmission case 16, and span a suitable aperture in the top wall of the case; the aperture providing for passage of forked extensions 92, 97.

Although any suitable means can be employed for fixedly securing shafts 101, 102 in brackets 103, 104, I preferably utilize a single securing means which locks both of the shafts adjacent the same ends thereof to bracket 104. For this purpose, shafts 101, 102 are slotted transversely at 108 (Fig. 6) to receive respective inclined end edges 109 of lock member 111. Lock member 111 is provided centrally thereof with aperture 112 (Fig. 7) having a frusto-conical wall adapted to receive washer 113 having a complementary formed edge wall. A screw 114 passes through washer 113 and aperture 112, and is threaded in aperture 116 formed in bracket 104. As clearly seen in Fig. 7, when screw 114 is tightened, the wedging action of the frusto-conical surfaces of washer 113 and aperture 112 wedge lock member 111 downwardly to effect tight engagement thereof with shafts 101, 102. Thus, shafts 101, 102 are securely anchored in bracket 104.

Shiftable collars 93, 98 are shiftable in either direction from a central neutral position by the gear shift lever 25 in a manner to be later described. For this purpose, the collars have lever-engaging portions, forming a row in the neutral positions thereof and which are engageable by the gear shift lever during a plurality of the shifted positions thereof. Collars 93, 98 are provided substantially centrally thereof with vertical spaced ears or extensions 121, 122 (Figs. 4 and 8), forming transverse slots to receive ball 123 (Fig. 4) on the lower end of gear shift lever 25. The transverse shifting of ball extension 123 of gear shift lever 25 with respect to collars 93, 98 is described more fully hereinafter.

Integral gears 62, 63 (Figs. 2 and 4) on lower transmission shaft 51 have annular groove 126 formed therebetween to receive forked extension 127 of collar 128, to provide for shifting movement of gears 62, 63. Collar 128 (Figs. 2 and 8) is similar to collars 93, 98 and is slidably mounted on shaft 129 having its ends mounted in wall 33 and cover 36. Shaft 129 is secured in position by lock member 131, secured to cover 36 and engaged in a transverse slot in shaft 129. Spaced vertical extensions 132 are provided on collar 128 to form a transverse slot in which is engaged ball end 133 of lever 134 (Figs. 2 and 8) pivotally mounted on stud 136 mounted on bracket 137. Bracket 137 also provides a mounting for the gear shift lever 25 and other associated parts of the control means as described hereinafter. Lever 134 (Fig. 2) is forked at its upper end to provide extensions 138 engaging opposite sides of cam 139. Cam 139 (Figs. 2 and 8) is keyed to an end of shaft 141 journaled in bosses 142 in bracket 137. Enlarged end 143 of shaft 141 and nut 144 threaded on the opposite end thereof secure shaft 141 in bracket 137 and also mount cam 139 securely in place. Cam 139 is engaged constantly by extensions 138; the contour of the cam being such that clockwise oscillation thereof causes like oscillation of lever 134, and counter-clockwise oscillation causes counter-clockwise oscillation of the lever.

Oscillation of cam 139, and consequently shifting movement of gears 62, 63 on shaft 51, is controlled by a row of elements adapted for engagement with an extension on the gear shift lever 25. Lateral shifting of the gear shift lever is designed to control the direction of movement of gears 62, 63 for oscillation of the gear shift lever in any direction. Shaft 141 has spaced integral gears 146, 147 (Figs. 4 and 8) keyed thereon between bosses 142; the inner end portions of gears 146, 147 meshing with gear 148 journaled by means of a suitable bushing on shaft 149 between bosses 151 (Fig. 8) of bracket 137, in which bosses shaft 149 in positioned. Gears 146, 147 and 148 together form a reversible gearing for operating cam 139, and are positioned in bracket 137 to be engaged by arcuate rack extension 156 of gear shift lever 25. When gear shift lever 25 is in a central position, so that rack 156 engages only gear 148, then oscillation of the rack in a given direction will result in cam 139 being oscillated in one direction. However, when rack 156 is shifted laterally to either side to engage either of gears 146, 147, then cam 139 will be oscillated in an opposite direction for the same direction of oscillation of the rack. Thus, it is seen that shaft 141 and cam 139 can be shifted about their axis in either direction by engagement of rack 156 with gear 148, or with either of gears 146, 147, depending upon the lateral position of the rack.

From the foregoing description, it is seen that extensions 121, 122 of collars 93, 98, and gears 146, 147, 148, form two transverse rows of movable elements adapted for engagement with integral extensions on the gear shift lever for selective operation thereby.

Gear shift lever 25 (Figs. 4 and 8) is fixedly keyed on shaft 161 centrally thereof; said shaft having enlarged ends 162 slidably and rotatably engaged in respective bosses 163 of bracket 137. Thus, gear shift lever 25 is mounted for transverse or lateral movement, and for rocking movement about the axis of shaft 161. It is also seen that gear shift lever 25 and the associated elements including gears 146, 147, 148, and forked member 134 are mounted as a unit on transmission case 16 with bracket 137, which is positioned within transmission case cover 17.

Means are provided for preventing the access of deleterious matter into the transmission case past gear shift lever 25. Lever 25 (Figs. 4 and 8) extends through an aperture in arcuate shield 171, which is urged by spring 174 against packing member 172 in packing retainer 173. Spring 174 is seated in cup-shaped retainer 175 which is cotter-held on gear shift lever 25. Packing retainer 173 (Fig. 4) is mounted by suitable screws on wall 176 of small cover 178, secured by suitable cap screws 177 to transmission case cover 17. The engagement of shield 171 with packing member 172 (Fig. 8) is maintained in any laterally shifted position of the lever by virtue of the width of shield 171, while the arcuate portion (Fig. 4) of the shield is of sufficient length to maintain sealing engagement in any rocked or oscillated position of the lever.

Figure 9:
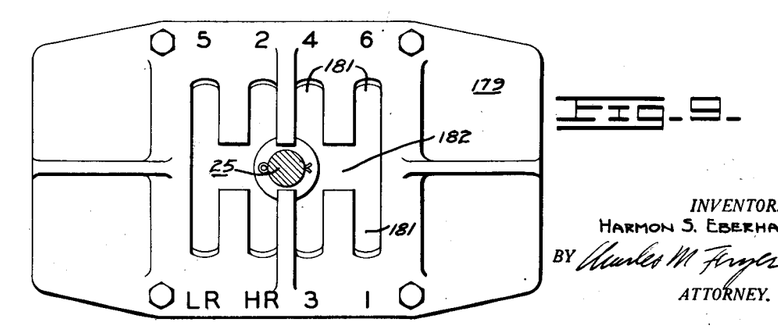
Fig. 9 is a fragmentary plan view in a plane indicated by line 9—9 in Fig. 8.

Cover 178 has a rectangular aperture at the top which is closed by plate 179 suitably secured by cap screws to cover 178. Plate 179 (Fig. 9) is provided with a plurality of opposed longitudinal slots 181 opening into central transverse slot 182 to control shifting movement of lever 25. Fig. 9 illustrates by marking, the position to which lever 25 must be shifted to obtain the different speeds enumerated in a preceding portion of this description.

Thus, a plurality of laterally shifted positions are provided for the gear shift lever whereby said lever may be placed in operative position with selected shiftable elements to control movement of various combinations of the shiftable transmission gears, as well as to control the direction of movement of such gears. As viewed in Fig. 8, the positioning of lever 25 in operative relation with opposed slots 181 at the extreme right meshes rack 156 with gear 146 and positions ball end 123 between ears 121 on collar 93. In the next position of lever 25 to the left, ball end 123 remains in engagement with ears 121, while rack 156 is shifted from engagement with gear 146 into engagement with gear 148. Hence, while gear shift lever 25 remains operatively engaged with ears 121 and the gears controlled thereby will be operated in the same manner as in the right-hand position of lever 25, reverse movement of the gears controlled from rack 156 has been determined. The next step of movement of lever 25 to the left, places ball end 123 between ears 122 of collar 98, while rack 156 remains engaged with gear 148. Thus, shifting movement of another set of shiftable gears is determined, different from that determined in the positions previously described. Further movement of lever 25 to the extreme left-hand position thereof serves to mesh rack 156 with gear 147 instead of with gear 148, thus reversing the direction of movement of the shiftable gears associated therewith; in such extreme left-hand position, ball end 123 remains in engagement between ears 122.

From the foregoing description, it is seen that a row of movable elements 121, 122 is provided, having lever engaging portions, each portion being adapted for operative engagement with a gear shift lever extension 123 during two steps of the lateral step-by-step positioning of the lever. Also, another row of movable elements 146, 148, 147 is provided, the intermediate element 148 of which operatively engages a gear shift lever extension 156 during the two intermediate steps of lateral shifting of the lever. Along the length of the row comprising elements 121, 122, each element 121 or 122 is adapted for engagement by lever extension 123, simultaneously with the engagement of lever extension 156 with either of the adjacent ends of elements 146 and 148, or 148 and 147 in the other row of shiftable elements depending on the lateral position of shift lever 25. In this connection, elements 146 and 147 actually form a unit element because of their union to the same shaft 141. Hence, the shaft element 141 is engaged by extension 156 in both extreme lateral positions of shift lever 25. As a result, while rack extension 156 is engaged with gear 148, ball extension 123 can be engaged with ears 121 or ears 122, because of overlapping relationship between gear 148 and ears 121, 122; rack extension 156 and ball extension 123 being vertically aligned. Although (Fig. 8) the ends of gear 148 intermesh with gears 146 and 147, rack 156 is prevented from oscillation when it is intermeshed with both gear 148 and gears 146 or 147, because of the intermediate extensions between guide slots 181 (Fig. 9). In effect, gear 148 acts as a reverse gear to reverse the direction of rotation of shaft 141 whenever arcuate rack 156 is in operable engagement with said gear.

The operation of the control means in response to shifting of lever 25 will now be explained in connection with Fig. 9 and the schematic views illustrated in Figs. 10 to 17.

Figs. 10 and 10A illustrate the conditioning of the parts when the gear shift lever has been moved in a position determining first speed drive. Referring to Fig. 10A, it is seen that lever 25 is operatively associated with gear 146 and shiftable collar 93 while reference to Fig. 10 discloses that clockwise movement of lever 25 has, through ball end 123 shifted collar 93 to the left to mesh gear 46 with gear 82 and also rocked cam 139 and forked lever 134 to shift collar 128 to the right thereby meshing gear 63 with gear 83. The drive thus determined is illustrated by the arrows, and has been described heretofore.

Fig. 15 illustrates the positions of the shiftable gears when lever 25 is positioned laterally as in Fig. 10A but is rocked in a counter-clockwise direction, whereby collars 93 and 128 are shifted oppositely to their direction of movement in Fig. 10, gear 47 being meshed with gear 83, and gear 62 with gear 82. Fig. 15 illustrates the sixth speed drive.

In Fig. 12, the third speed drive is illustrated, lever 25, as shown in Fig. 12A, being adjusted to operative relation with respect to gear 148 and collar 93, that is, one step to the left from the position shown in Fig. 10A. In Fig. 12, lever 25 is rocked in a clockwise direction to shift collar 93 to the left, meshing gear 46 with gear 82, and collar 128 is also shifted to the left to mesh gear 62 with gear 82. It is to be noted that in this position, due to the overlapping of collar 93 with respect to gears 146 and 148, the one step movement of lever 25 determines a reversal of the direction of movement of collar 128.

In Figs. 13 and 13A, the parts are adjusted as in Figs. 12 and 12A, respectively, except that lever 25 is oscillated in a counter-clockwise direction, gears 47 and 63 being meshed with gear 83 by virtue of the reversed movement of the collars associated therewith. Fig. 13 illustrates the fourth speed drive.

Figs. 11 and 11A illustrate lever 25 positioned in another step to the left of that shown in Figs. 12A and 13A, said lever maintaining its operative engagement with gear 148, but being shifted out of engagement with collar 93 into engagement with collar 98. This movement serves to select shiftable gear 48 for control by the gear shift lever in the place of gears 46, 47. In Fig. 11, gear shift lever 25 is oscillated in a counter-clockwise direction whereby gears 48 and 63 are shifted to the right to mesh respectively with gears 84 and 83, thus determining the second speed drive.

In Figs. 17 and 17A, the parts are conditioned as illustrated in Figs. 11 and 11A, respectively, but gear shift lever 25 is oscillated in a clockwise direction. Hence, gears 48 and 62 are shifted to the left to mesh respectively with gears 71 and 82, whereby the drive is transmitted from gear 48 through reverse idler gears 71, 72 to shaft 81, and through gear 82 to gear 62 and shaft 51. This positioning of the parts obtains the high-reverse drive.

In Fig. 14A, lever 25 is moved to its extreme left-hand position where it is operatively engaged with gear 147 and collar 98. Upon counter-clockwise oscillation of gear shift lever 25 as illustrated in Fig. 14, gear 48 is shifted to the right to mesh with gear 84, and gear 62 is shifted to the left to mesh with gear 82, such positioning of the parts determining the fifth speed drive of the transmission.

In Figs. 16 and 16A, gear shift lever 25 is positioned laterally as in Figs. 14 and 14A, but is oscillated in a clockwise direction, whereby gear 48 is meshed with gear 71 and gear 63 with gear 83. The drive, therefore, is taken from shaft 31 through gears 48, 71, 72 and 84 to shaft 81, and from shaft 81 through gears 83 and 63 to shaft 51. The speed thus determined is the low-reverse.

It is thus seen that either of gearing 46, 47 or gearing 48 on shaft 31 can be simultaneously shifted with the gearing 62, 63 on shaft 51, or in other words shifted during a single shifting operation by the same control lever 25, to provide obtaining of the multiple drives described. In this connection, it will be observed from Figs. 4 and 10 through 17A, that because end 123 of lever 25 is directly engageable in either of the slots between the ears 121 on shift collars 93 or 98 forming, respectively, part of the shifting connections to gearing 46, 47 or gearing 48, either of such gearing will be caused to move immediately upon movement of shift lever 25.

However, because of the provision of cam 139 in the shifting connection to gearing 62, 63, movement of such gearing will lag behind the movement of either of gearing 46, 47 or gearing 48 being shifted therewith; the cam having cam portions and dwell portions for this purpose as shown in Figs. 2 and 10 through 17A. This facilitates meshing of the gears when either of gearing 46, 47 or gearing 48 is shifted together with gearing 62, 63 because the lag in movement of gearing 62, 63 resulting from the provision of the cam, enables either of gearing 46, 47 or gearing 48 to start meshing with the gearing to be engaged therewith, prior to meshing of gearing 62, 63 with the gearing to be connected thereto. Hence, the operator is not faced with the problem of having to mesh two sets of gearing exactly at the same instant.

Means is provided for locking the shiftable transmission gears in any shifted position thereof to prevent accidental disengagement of said gears during driving operation of the transmission, said locking means being controlled by engagement and disengagement of the engine clutch for driving the upper transmission shaft. It will be recalled that gear shift lever 25 in any laterally displaced position thereof is always operatively engaged with one of collars 93, 98 (Figs. 4 and 8) and with one of intermeshing gears 146, 147, 148. Consequently locking of the collars in any shifted position thereof serves not only to lock the shiftable gears controlled by said collars but also the shiftable gears controlled by said gears 146, 147, 148. Collars 93, 98 (Figs. 4 and 8) are provided with inwardly extending adjacent flanges 186; and each flange 186 is provided with a plurality of similarly spaced wedge-shaped notches 187. Associated with notches 187 in each flange 186 is a lever 188 having a key extension 189 formed complementally to the shape of notches 187. Each lever 188 is pivoted at one end thereof on pin 191 (Figs. 4 and 6) between depending ears 192 of bracket 104. The opposite ends of levers 188 (Figs. 2, 3 and 4) have threaded engagement with bolts 194, extending upwardly through apertures in bracket 103 and having springs 196 compressed between bracket 103 and nuts 197 threaded on the bolts. Thus, it is seen that springs 196 and bolts 194 urge levers 188 upwardly to latching position. The resistance of springs 196 is overcome during shifting operation by the cooperating inclined cam surfaces (Fig. 4) of projections 189 and notches 187.

To lock positively levers 188 in position when the shiftable transmission gears are adjusted to determine a given speed and after a pair of notches 187 are transversely aligned and engaged by respective projections 189 on levers 188, a locking member 201 is employed. Locking member 201 is pinned on shaft 202 (Figs. 3 and 4) journaled in bosses 203 of bracket 103. Rocking of shaft 202 in a counter-clockwise direction to the position shown in Fig. 4, places nose 204 of member 201 beneath the ends of levers 188 to lock positively levers 188 in latching engagement with shifting collars 93, 98. Shaft 202 (Fig. 3) extends through left-hand boss 203 and has arm 206 pinned thereon. The free end of arm 206 (Fig. 2) is positioned in notch 207 of shaft 208 mounted for sliding movement in boss 213 of bracket 214 secured by suitable cap screws to cover 36. Shaft 208 is also notched at 216 to receive an end of arm 217 fixed on rock shaft 218 suitably journaled in bracket 214. Also, secured on shaft 218 for movement therewith is two-armed lever 219 having one end connected to clutch shifting mechanism 221 and its other end connected to link 222. Link 222 is also pivotally connected to arm 223 on rock shaft 224 which is pivoted in cover 17 and extends therethrough (Fig. 8) to mount clutch control lever 24.

Figure 2:
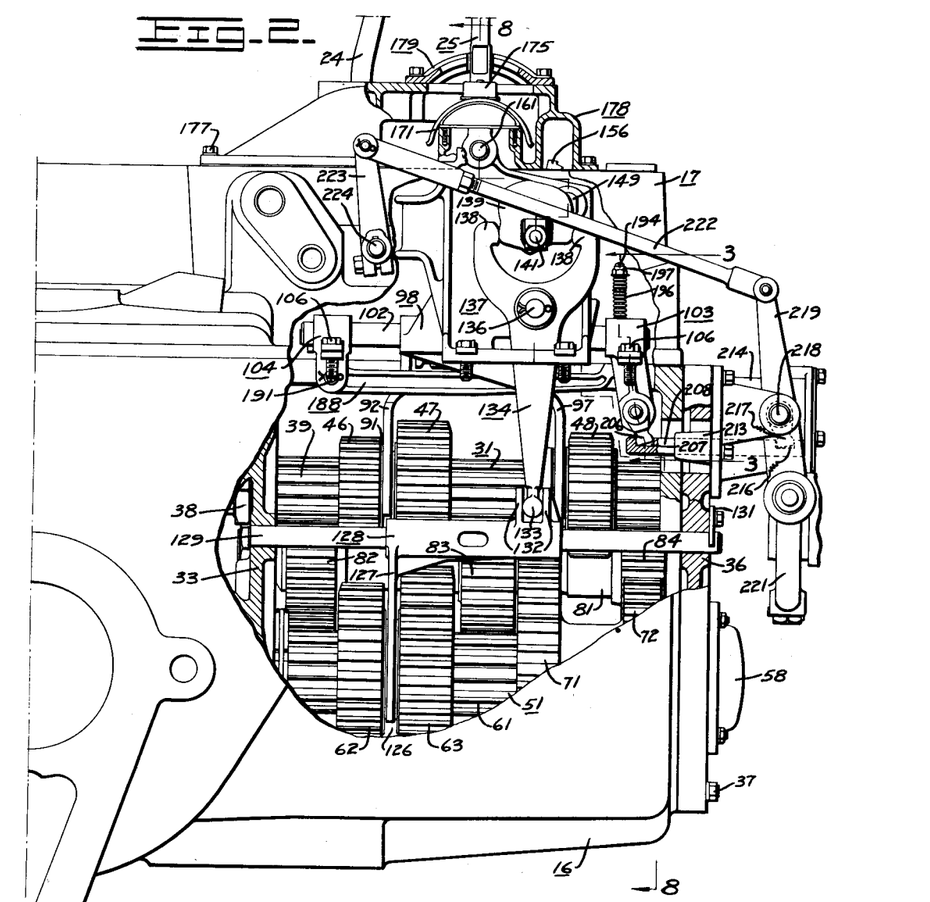
Fig. 2 is a side elevational view of the transmission case which is broken away in part to disclose the transmission mechanism.
Figure 3:
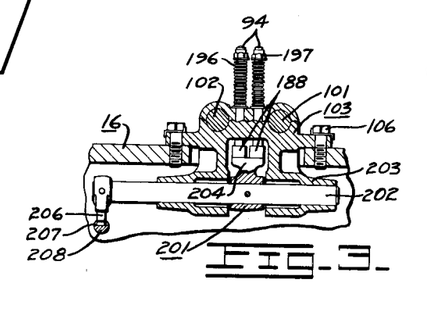
Fig. 3 is a fragmentary sectional view taken on the line 3—3 in Fig. 2.

From the foregoing description, it is seen that movement of clutch control lever 24 to the right, as viewed in Fig. 2, rocks shaft 224; and through the described linkage, shaft 218 is rocked in a clockwise direction whereby shaft 208 is moved to the left and locking member 201 (Fig. 4) is moved from beneath the ends of levers 188. Hence, shifting collars 93, 98 are unlocked to enable shifting of the transmission gears by lever 25. The described movement of lever 24 to the right serves to disengage the clutch which transmits the drive for the upper transmission shaft 31. Upon movement of lever 24 to the left or clutch engaging position, shaft 208 is moved to the right as viewed in Fig. 2, thereby urging locking member 201 into position beneath the ends of lever 188. In the event the gears are not accurately positioned so that a notch 187 in each of the shifting collars 93, 98 is not aligned with the proper corresponding projections 189, movement of clutch control lever 24 is prevented because locking member 201 will engage the end of the lever 188 which is displaced from its latching position. Thus, an interlock is provided between the gear shift and clutch controls 25, 24, which positively prevents movement of one of the control levers when the other is improperly conditioned.

It is seen that the transmission gears are positively locked in any shifted position thereof when the clutch is engaged and the transmission is in operation. Disengagement of the clutch serves automatically to condition transmission lever 25 for shifting of the gears. When the clutch is disengaged, and when the gears are being shifted, the latching means which projections 189, recesses 187 and spring thrust members 188 provide, enable proper positioning of the shifting members in latched position.

Figure 2A:
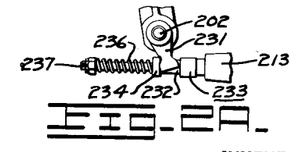
Fig. 2A is a fragmentary elevational view illustrating a modified construction of a portion of the locking means for the gear shifting mechanism.

Should no positive interlock be desired between the gear shift and clutch control levers 24 and 25, and should it be desired that the above-described locking mechanism function only as a lock for the gear shift mechanism, the modified structure illustrated in Fig. 2A can be employed. In this construction, forked arm 231 is mounted on shaft 202, similarly to arm 206, and has its forked end embracing reduced portion 232 of shaft 233, which is mounted in boss 213 similarly to shaft 208. The forked end of arm 231 is positioned between a shoulder on shaft 233 and a washer 234 loosely mounted on shaft 233; the washer 234 being urged against a suitable shoulder on said shaft by spring 236 mounted on the shaft between washer 234 and nut 237 threaded on shaft 233. With the above construction, it is seen that when a lever 188 is not in latching position with respect to the associated collar 93 or 98, and clutch control lever 24 is operated to engage the clutch, spring 236 yields so that arm 231, shaft 202, and locking member 201 are not actuated; member 201 being engaged with the end of displaced lever 188. As a result, the clutch can be engaged, and no breakage of the parts can occur which might happen with respect to the previously described construction should the operator force lever 24 in an effort to engage the clutch. At the same time, the operator is warned by the increased resistance to movement of clutch control lever 24, that the gear shift mechanism is not properly positioned.

Therefore, I claim as my invention:

1. In a transmission, driving and driven transmission shafts; a third shaft; a plurality of gears spaced in fixed relation on said third shaft; a plurality of sets of gears slidably and non-rotatably mounted on one of said first-named shafts, said sets of gears being shiftable selectively to engage associated gears on said third shaft; and a plurality of sets of gears mounted on the other of said first-named shafts, one of said last-named sets being rotatably and non-shiftably mounted, and another of said last-named sets being shiftably and non-rotatably mounted; said one of said last-named sets including a gear constantly meshed with one of said third shaft gears, and a second gear positioned for engagement by one of said first-named sets of gears; said another of said last-named sets being shiftable selectively to engage associated gears on said third shaft.

2. In a transmission, driving and driven transmission shafts; a third shaft; first, second, and third gears secured in spaced-apart relation on said third shaft and rotatable therewith; a set of gears slidably and non-rotatably mounted as a unit on one of said first-named shafts, said set of gears being shiftable selectively in either direction from a neutral position to engage either said first or second gears; a second set of gears rotatably and non-slidably mounted as a unit on said one of said first-named shafts, one gear of said second set being meshed with said third gear; a third set of gears slidably and non-rotatably mounted as a unit on the other of said first-named shafts, said third set of gears being shiftable selectively in either direction from a neutral position to engage either said first or second gears; and a gear slidably and non-rotatably mounted on said other of said first-named shafts, said latter gear being shiftable selectively in either direction from a neutral position to engage said third gear or the other of said second set of gears.

3. In a transmission, driving and driven shafts, a third shaft, a plurality of gears spaced in fixed relation on said third shaft, a plurality of gears splined on said driving shaft and shiftable to engage a selected gear on said third shaft, a plurality of gears splined on said driven shaft and shiftable to engage a selected gear on said third shaft, and other gears mounted for rotation as a unit about one of said first-named shafts, one of said other gears being constantly meshed with one of said third shaft gears.

4. In a transmission, a first shaft, a second shaft, gearing mounted for rotation with and for axially slidable movement along said first shaft, gearing mounted for rotation with and for axially slidable movement along said second shaft, reverse gearing journaled for rotation about one of said shafts, spaced gears between said shafts and secured for rotation together, one of said spaced gears being adapted to mesh with said reverse gearing, and means for establishing any one of a plurality of driving connections between said first and second shafts through a selected combination of said shaft gearing and said spaced gears.

5. In a transmission, selective control means for a plurality of shiftable gearing; comprising a set of connections for some of said gearing, a second set of connections for other of said gearing, and a shift lever mounted for step-by-step movement, each connection having a lever-engaging portion providing for operative engagement with said lever during two steps of movement of said lever, said lever-engaging portions of each set forming a row for selective engagement by said lever upon step-by-step shifting movement thereof, each lever-engaging portion of each row being associated with adjacent ends of lever-engaging portions of another row, whereby each step of movement of said lever determines operative engagement thereof with a different pair of said lever-engaging portions.

6. In a transmission, selective control means for a plurality of shiftable gearing; comprising a set of members for some of said gearing, another set of members for other of said gearing, a movable shift lever having means for connecting with selected of said members, each member of one set being so arranged that it can be connected with said lever when said lever is connected with any one of a plurality of members of the other set.

7. In a transmission, a control member mounted for step-by-step movement to shift selectively gearing to establish a driving connection, and connections for said gearing having member-engaging portions disposed in substantially parallel rows adjacent said member, said portions of one row being associated with adjacent end portions of another row, whereby each step of movement of said member determines operative engagement thereof with a different pair of said portions.

8. In a transmission, a control member mounted for movement in reverse directions to shift selectively gearing to establish a driving connection, and a plurality of connections for said gearing and cooperating with said member; at least one of said connections including reversible means for optionally reversing the movement transmitted thereby, irrespective of the direction of movement of said member.

9. In a transmission, a control member mounted for shifting movement to shift selectively gearing to establish a driving connection, a plurality of movable elements mounted adjacent said member, and connections from said elements for said gearing, said member having a plurality of extensions adapted for engagement with said elements to determine simultaneous shifting movement of some of said elements in response to movement of said member, said member being shiftable to select different combinations of said elements.

10. In a transmission, a shaft, a plurality of sets of shiftable selecting gearing mounted for rotation with and axially movable in any one of opposite directions along said shaft, a second shaft, shiftable selecting gearing mounted for rotation with and axially movable in any one of opposite directions along said second shaft, reversing gearing journaled about one of said shafts in addition to the gearing shiftable along said shaft and engageable by one of said shiftable selecting gearing along the other of said shafts, and countershaft gearing for engagement by said shiftable selecting gearing.

11. In a transmission having a plurality of shiftable gearing, a shift lever-engaging member forming part of a shift connection for one of said gearing, intermeshed gears forming part of a shift connection for other of said gearing, a gear shift lever having an extension to engage said member, and a rack extension forming a part of said gear shift lever for meshing with any one of said intermeshed gears simultaneously with engagement of said extension with said member.

12. In a transmission, movable means for determining the character of drive transmitted by the transmission, yieldably mounted latching means for engaging said movable means to hold said movable means in a proper position, means for establishing a drive through said transmission, and means actuated by said drive establishing means for automatically locking said latching means when a drive is transmitted including a yieldable connection for yieldably resisting establishment of said drive when said movable means is improperly positioned.

13. In a transmission, one set of shiftable gearing, another set of shiftable gearing cooperable therewith, a shifting device including a plurality of parts for simultaneously operating both sets of shiftable gearing, a latching member engageable with one of said parts to hold said device against movement, and locking means for said latching member.

14. Shift mechanism for a transmission having a plurality of shiftable gearing for establishing any selected one of a plurality of drives through said transmission, comprising a shift lever supported for both rocking and lateral movement; a shift connection for one of said gearing having means for engagement by said shift lever in any one of a plurality of laterally shifted positions thereof; and a shift connection for another of said gearing including a rotatably mounted member, an arcuate member on said shift lever for engaging said rotatably mounted member in one of the laterally shifted positions of said shift lever while engaged with said means, and a second rotatably mounted member engaging said first mentioned rotatably mounted member and adapted to be engaged by said arcuate member in another of the laterally shifted positions of said shift lever while still engaged with said means.

15. Shift mechanism for a transmission having a plurality of shiftable gearing for establishing any selected one of a plurality of drives through said transmission, comprising a shift lever; a shift connection for one of said gearing having means for engagement by said lever; and a shift connection for another of said gearing including a member movable by said shift lever, a cam mounted for movement with said member for effecting lag of movement between said gearing, and a lever engaging said cam.

16. Shift mechanism for a transmission having a plurality of shiftable gearing for establishing any selected one of a plurality of drives through said transmission, comprising a shift lever; a shift connection for one of said gearing having means for direct engagement with said lever; and a shift connection for another of said gearing including a rotatably mounted member, an arcuate member connected to said shift lever for engaging said rotatably mounted member, a cam rotatable with said rotatably mounted member for effecting lag of movement between said gearing, and a lever engaging said cam.

17. Shift mechanism for a transmission having a plurality of shiftable gearing for establishing any selected one of a plurality of drives through said transmission, comprising a shift lever; a shift connection for one of said gearing having an element for engagement by said lever in one position thereof; a second shift connection for a second of said gearing having an element for engagement by said lever in another position thereof; and an additional shift connection for additional gearing including a member movable by said shift lever and positioned adjacent said elements whereby said additional shift connection can be operated when the shift lever is engaged with either one of said elements, a cam mounted for movement with said member, and a lever engaging said cam.

18. Shift mechanism for a transmission having a plurality of shiftable gearing for establishing any selected one of a plurality of drives through said transmission, comprising a shift member; a shift connection for one of said gearing having an element for engagement by said shift member in one position thereof; a second shift connection for a second of said gearing having an element for engagement by said shift member in another position thereof; and an additional shift connection for additional gearing including a rotatably mounted member positioned adjacent said elements, and an arcuate member connected to said shift member for engaging said rotatably mounted member simultaneously with engagement of said shift member with either of said elements.

19. Shift mechanism for a transmission having a plurality of shiftable gearing for establishing any selected one of a plurality of drives through said transmission, comprising a shift member, a plurality of shift connections having elements for engagement by said shift member, another shift connection including a movably mounted member adjacent said elements, and means connected with said shift member for engaging said movably mounted member simultaneously with engagement of said shift member with any of said elements.

20. Shift mechanism for a transmission having a plurality of shiftable gearing for establishing any selected one of a plurality of drives through said transmission, comprising a shift member, a plurality of shift connections having elements for engagement by said shift member, another shift connection including reversible drive establishing mechanism, and means connected with said shift member for engaging said mechanism simultaneously with engagement of said shift member with any of said elements.

21. Shift mechanism for a transmission having a plurality of shiftable gearing for establishing any selected one of a plurality of drives through said transmission, comprising a shift member, a plurality of shift connections having elements for engagement by said shift member, another shift connection including a movably mounted member adjacent said elements, a cam for producing lag of motion connected for movement with said movably mounted member, and means connected with said shift member for engaging said movably mounted member simultaneously with engagement of said shift member with any of said elements.

22. Shift mechanism for a transmission having a plurality of shiftable gearing for establishing any selected one of a plurality of drives through said transmission, comprising a shift member, a plurality of shift connections having elements for engagement by said shift member, another shift connection including reversible drive establishing mechanism, a cam for producing lag of motion connected for movement with said mechanism, and means connected with said shift member for engaging said mechanism simultaneously with engagement of said shift member with any of said elements.

23. Shift mechanism for a transmission having a plurality of shiftable gearing for establishing any selected one of a plurality of drives through said transmission, comprising a shift lever supported for both rocking and lateral movement; a shift connection for one of said gearing having means for engagement by said shift lever in any one of a plurality of laterally shifted positions thereof; and a shift connection for another of said gearing including a rotatably mounted member, an arcuate member movable with said shift lever for engaging said rotatably mounted member in one of the laterally shifted positions of said shift lever while engaged with said means, a second rotatably mounted member engaging said first mentioned rotatably mounted member and adapted to be engaged by said arcuate member in another of the laterally shifted positions of said shift lever while still engaged with said means, and a cam for producing lag of motion movable by said rotatably mounted members.

24. In a transmission, shiftable gearing, shifting means for said gearing, latching means for holding said shifting means in position to prevent accidental disengagement of said gearing during driving operation of said transmission, a movably mounted member engageable with said latching means for locking said latching means in said position, means for establishing a drive through said transmission and having a connection with said locking member to engage said locking member with said latching means upon establishment of the drive, and means in said connection yieldable when the locking member is in improper engagement with said latching means during establishment of the drive.

25. In a transmission, shiftable gearing, shifting means for said gearing, means cooperable with said shifting means and including a locking member for holding said shifting means in position to prevent accidental disengagement of said gearing during driving operation of said transmission, means for establishing a drive through said transmission and having a connection with said locking member to actuate said locking member to locking position upon establishment of the drive, and yieldable means in said connection.

HARMON S. EBERHARD.